(12) United States Patent
Holman et al.

(10) Patent No.: US 6,453,393 B1
(45) Date of Patent: Sep. 17, 2002

(54) METHOD AND APPARATUS FOR INTERFACING TO A COMPUTER MEMORY

(75) Inventors: Thomas J. Holman, Portland; Andrew V. Anderson, Hillsboro, both of OR (US)

(73) Assignee: Intel Corporation, Santa Clara, CA (US)

( * ) Notice: Subject to any disclaimer, the term of this patent is extended or adjusted under 35 U.S.C. 154(b) by 163 days.

(21) Appl. No.: 09/663,918

(22) Filed: Sep. 18, 2000

(51) Int. Cl.$^7$ .............................................. G06F 12/00
(52) U.S. Cl. ...................................... 711/154; 711/105
(58) Field of Search ............................... 711/105, 106, 711/115, 148, 154, 170

(56) References Cited

U.S. PATENT DOCUMENTS

| | | | |
|---|---|---|---|
| 5,499,355 A | 3/1996 | Krishnamohan et al. | |
| 5,892,768 A | * 4/1999 | Jeng | 370/445 |
| 5,996,042 A | * 11/1999 | Pawlowski et al. | 711/105 |
| 6,002,411 A | * 12/1999 | Dye | 345/532 |
| 6,075,730 A | 6/2000 | Barth et al. | |
| 6,133,773 A | 10/2000 | Garlepp et al. | |
| 6,366,989 B1 | * 4/2002 | Keskar et al. | 365/230.03 |

OTHER PUBLICATIONS

Pending U.S. Patent Application titled "Memory System Including a Memory Module Having a Memory Module Controller", inventor Thomas J. Holman.

* cited by examiner

Primary Examiner—Hiep T. Nguyen
(74) Attorney, Agent, or Firm—Pillsbury Winthrop LLP

(57) ABSTRACT

A memory system includes a primary memory interface, coupled to a primary device, adapted to receive memory requests from the primary device, and to transmit memory device independent requests based on the memory requests from the primary device. An external memory interface is coupled to at least one memory device via a memory interconnect. A memory independent interconnect, coupled to the primary memory interface and the external memory interface, is adapted to transport the memory device independent requests from the primary memory interface to the external memory interface.

20 Claims, 4 Drawing Sheets

400

410

420

METHOD AND APPARATUS FOR INTERFACING TO A COMPUTER MEMORY

BACKGROUND OF THE INVENTION

1. Field of the Invention

The present invention relates generally to a memory system, and more specifically, to an interface and protocol for a memory system that is independent of the memory type utilized.

2. Discussion of the Related Art

Advances in process technology together with trends in system architecture are motivating designers to consider the integration of memory controller functions within the processor. This integration can result in lower costs because of the reduced device count and improved performance due to tighter coupling between the memory controller and the processor. Furthermore, this integration supports the trend away from system architectures with multi-drop buses. Alternate architectures are being considered because the bandwidth of "front-side bus plus chipset" architectures is limited by long stub lengths and package pin-count constraints. This is a particularly important issue for multiprocessor systems because of the larger number of devices that must share a common bus. The consequence is that multiprocessor systems are moving from shared-memory to distributed-memory architectures. The integration of the memory controller is synergetic with this distributed memory approach.

However, there are a number of issues with directly connecting a memory to a processor. First, support for a particular type or types of memory must be designed into the processor. This approach exposes the processor to market dynamics of the supported memory types and adds risk in terms of market acceptance and market share. For example, the "best" memory type may change between the design start and the product launch. Also, the processor may not be compatible with the input/output voltages of the memory devices. Memory devices typically have higher voltages due to (1) process differences, (2) the high-load multi-drop nature of the memory interconnect, and (3) established standards for memory device input/output voltages. Thirdly, memory expansion is limited to that available on the memory interconnect. For many market segments, limited expansion capability is not acceptable.

Adding an external component to bridge between the processor and the memory devices can revolve the issues involving input/output voltages and memory expansion, but issues involving different types of memory support having to be designed into the processor remain unresolved. If the memory control functions on the processor device and/or the interconnect to the external device have memory dependent functions (i.e., these functions are specific to a particular type of memory device and not compatible with other memory types), then this approach has the same risks mentioned above. There are also other issues with using memory dependent functions, such as that a memory dependent protocol must be developed for communication with the external device. This protocol must comprehend the details of all the memory types to be supported, and so market risks are still present. If a memory type is added later, it requires changes to both the primary and external devices, and may require changes to the protocol as well. This approach results in considerable scheduling difficulties. Therefore, integrating memory dependent functions on a primary device may have a number of undesirable consequences.

DETAILED DESCRIPTION

Figures 1, 2:
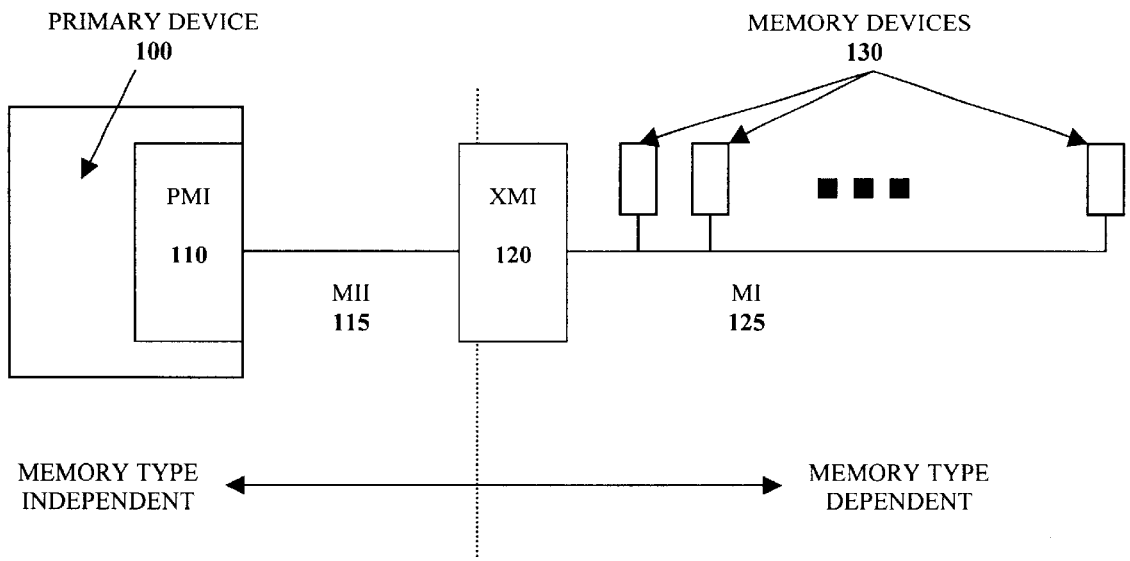
FIG. 1 illustrates the main components of a memory system according to an embodiment of the present invention.
FIG. 2 illustrates sample arrangements of transaction packets utilized in a memory system according to an embodiment of the present invention.

FIG. 1 illustrates the main components of a memory system according to an embodiment of the present invention. The three major components of the memory system include: (1) a primary memory interface (PMI) 110, (2) a memory independent interconnect (MII) 115, (3) an external memory interface (XMI) 120, a memory (dependent) interconnect (MI) 125, and memory devices 130. The PMI 110 provides an interface between a primary device 100, such as a processor and the MII 115. The PMI 110 may be integrated with the primary device 100.

The MII 115 includes the physical connection, along with the protocol, that defines the memory independent transactions that occur along this link. However, the physical connection of the MII 115 is not a general purpose interconnect, but rather, it is one that reaches a balance between providing an efficient interface to memory, while remaining memory independent. The physical connection is preferably a point-to-point link between the PMI 110 and the XMI 120. The XMI 120 provides a bridge between the MII 115 and the memory devices 130. Memory devices 130 may be dynamic random access memory (DRAM) such as synchronous DRAM (SDRAM), a double data rate SDRAM (DDR-SDRAM), or other memory configurations such as quad-data rate (QDR). However, any suitable memory device 130 may be utilized, though. The transition to and from memory type dependence occurs within the XMI 120, which communicates with the memory devices 130 via the memory interconnect 125.

The PMI 110 receives memory requests from the functions provided by the primary device 100. These requests are queued in the PMI 110 and converted to the MII 115 protocol and sent to the XMI 120. The PMI 110 preferably includes different forms of request processing, such as request stream arbitration and request decoding. The PMI 110 may also provide functions such as buffering of writes, write buffer snooping, and prefetching. However, the PMI 110 does not contain any functions that depend upon the memory type. That is, the operations issued by the PMI 110 to the XMI 120 are generic in format according to the MII 115 protocol being utilized. Therefore, as long as the PMI 110 and XMI 120 utilize the same protocol via the MII 115, no memory-type specific functions are required in the communication between the PMI 110 and the XMI 120. Data returned to the MII 115 from the XMI 120 is forwarded to the originating function on the primary device 100. The data return path may contain optional data manipulation, such as error checking.

The XMI 120 decodes the transmissions under the MII 115 protocol and utilizes the results to generate memory dependent requests to the memory devices 130. All memory dependent functions are located on the XMI 120. In other words, the XMI 120 acts as a "translator" to translate generic function calls, as set forth in the MII 115 protocol received from the PMI 110, into the memory dependent functions that are unique to a particular type of memory device 130 being utilized in the memory system. These memory dependent functions may include address decode, page management, power management, refresh control, memory device protocol generation, memory device timing, and configuration and initialization of memory devices. The XMI 120 may also include other functionality so as to perform, for example, as a write buffer, or as a prefetch unit. Data returned from the memory devices 130 are encapsulated in the MII 15 protocol and sent to the PMI 110. The data return path may contain optional data manipulation, such as error checking. The memory dependent functions initiated by the XMI 120 to the memory devices 130 are in a format that is compatible with the memory devices 130 being utilized. These memory devices 130 may be of an existing type, such as SDRAM, DDR, QDR, or a later developed memory type. The memory dependent functions/transactions from the XMI 120 to the memory devices 130 are similar to the functions called by a memory controller to an attached memory device, as utilized in conventional memory systems. Such functions/transactions are specific to the device type serving as the memory device 130.

Figure 5:
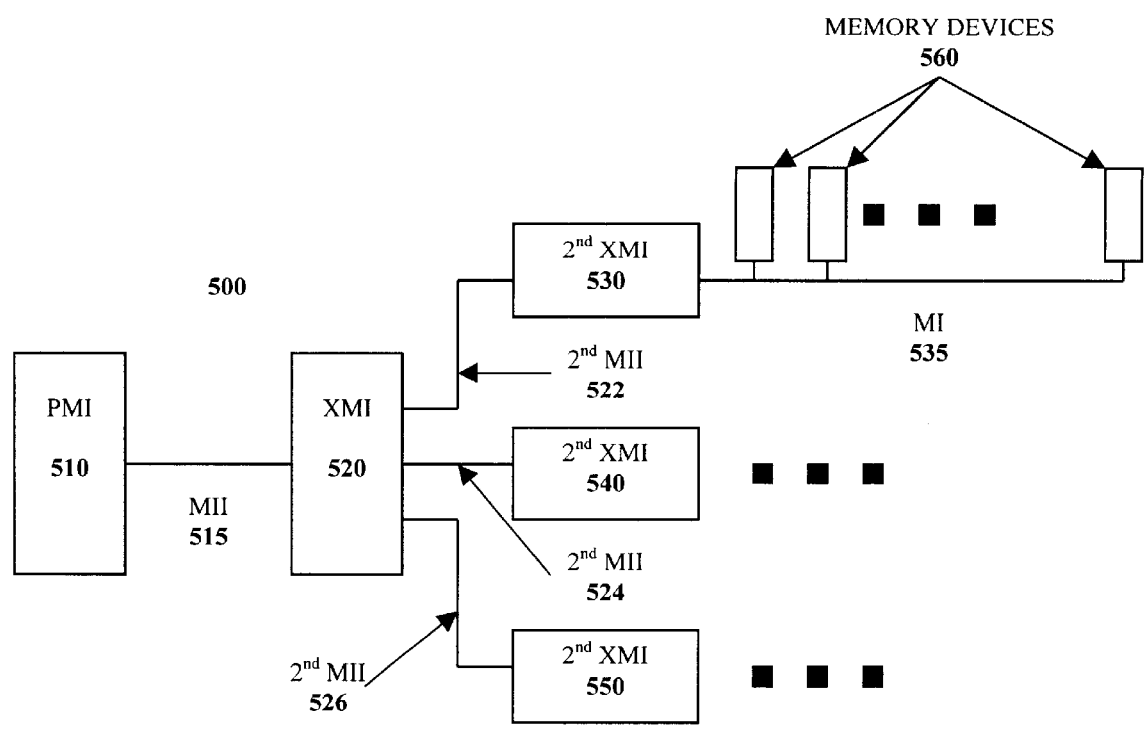
FIG. 5 illustrates a multi-level configuration of a memory system according to an embodiment of the present invention.

FIG. 5 illustrates a multi-level configuration of a memory system 500 according to an embodiment of the present invention. As illustrated in FIG. 5, the memory system 500 may be configured so that the XMI 520 may be bridged by other secondary XMIs 530, 540, 550, with each of the secondary XMIs 530, 540, 550 being coupled to memory devices 560. That is, a primary memory independent interconnect (XMI) 520 is adapted to connect to a plurality of secondary XMIs 530, 540, 550, which each have a memory interconnect (MI) 535 coupling the secondary XMIs 530, 540, 550 to their respective memory devices 560. The XMI 520 is coupled to the secondary XMIs 530, 540, 550 via respective secondary memory independent interconnects 522, 524, 526. The multi-level configuration illustrated in FIG. 5 allows for greater memory expansion capability by providing more memory interconnects to which the memory devices 560 may be coupled, thus increasing the memory capacity of memory system 500. Different types of memory devices 560 may be respectfully coupled to the different secondary XMIs 530, 540, 500, such as SDRAM, DDR, QDR, and combinations thereof. For example, secondary XMI 530 may act as a cache interface where memory devices 560 operates at DDR or QDR, and other interfaces, e.g. secondary XMI 540 and/or secondary XMI 550 operate at equal or slower rates.

Referring again to FIG. 1, the MII 115 link is a preferably a point-to-point connection. The MII 115 is utilized to transport commands and write data to the XMI 120, as well as read data and status information from the XMI 120. The MII 115 protocol defines logical structures used to form transactions on the MII 115 link. These transactions allow memory independent read and write operations to be carried out between the PMI 110 and XMI 120 components, as well as any other auxiliary commands.

There are four basic operation types that may be used to form transactions: commands, write data transfers, read data transfers, and status operations. Commands are used primarily to send command and address information to the XMI 120 to initiate a memory operation. These commands may be used to issue auxiliary commands for configuration and maintenance operations, and may contain additional fields to indicate request type, tags, and write mask information. A write data transfer is used to carry write data to the XMI 120. A read data transfer is used to carry read data from the XMI 120. As an example, a read data transaction may consist of a command sent from the PMI 110 to the XMI 120, followed some time later by a read data transfer from the XMI 120 to the PMI 110. Status operations are used to return the status of the XMI 120 or the status of a particular memory operation.

Each of the above-mentioned operations may be implemented in the form of information packets, which have specific fields. For example, the following table provides a representative list of fields and how they correspond to the four operations discussed above. However, the actual implementation, some fields may be encoded together.

TABLE 1

| Field | Cmd | Read Data | Write Data | Status | Description |
|---|---|---|---|---|---|
| Packet Control (PC) | X | X | X | X | Identifies packet presence (framing) and packet type (cmd, read data, write data, status). |
| Flow Control (FC) | X | X | X | X | Controls the flow of packets to prevent overflow of resources in the PMI 110 and the XMI 120, e.g., data buffers, and cmd queues. |
| Command | X | | | X | Indicates read, write, or other auxiliary commands, and optional commands from XMI 120 to PMI 110. |
| Status | | | | X | Status ot the XMI 120 or ot a particular transaction. |
| Type | X | | | | Command qualifier, e.g., a read could be a memory read or a configuration read. |
| Length | X | | | | Length of the requested data. |
| Cmd Options | X | | | | Request source, write mask, etc. |
| Address | X | | | | Address of request data in the memory array. |
| Tag | | X | X | | Optional field used to indicate association of data packets to a request address. Used for out-of-order data return. |
| Data | | X | X | | Read or write data. |
| Error Control | X | X | X | X | Error detection codes over the packet. Can include |

TABLE 1-continued

| Field | Cmd | Read Data | Write Data | Status | Description |
|---|---|---|---|---|---|
| (EC) | | | | | correction capabilities. Covers data and optionally the address and control fields. |

FIG. 2 illustrates sample arrangements of transaction packets utilized in a memory system according to an embodiment of the present invention. The command transaction packet 200 and the write data packet 210 are packets which are transmitted to the XMI 110, while the read data packet 220 and the status transaction packet 230 are packets that are transmitted from the XMI 120. The command transaction packet 200 may include data representing the following fields: packet control (PC), flow control (FC), command, type, length, options, address, and error control. The write data packet 210 may include data representing the following fields: packet control (PC), flow control (FC), tag, data, and error control (EC). The read data packet 220 may include data representing the following fields: packet control (PC), flow control (FC), tag, data, and error control (EC). The status transaction packet 230 may include data representing packet control (PC), flow control (FC), status, and error control (EC). For memory systems utilizing multi-level configurations as illustrated in FIG. 5, these packets may also be transported across the secondary MII links 522, 524, 526 from the primary XMI 520 to the secondary XMIs 530, 540, 550.

Figure 3:
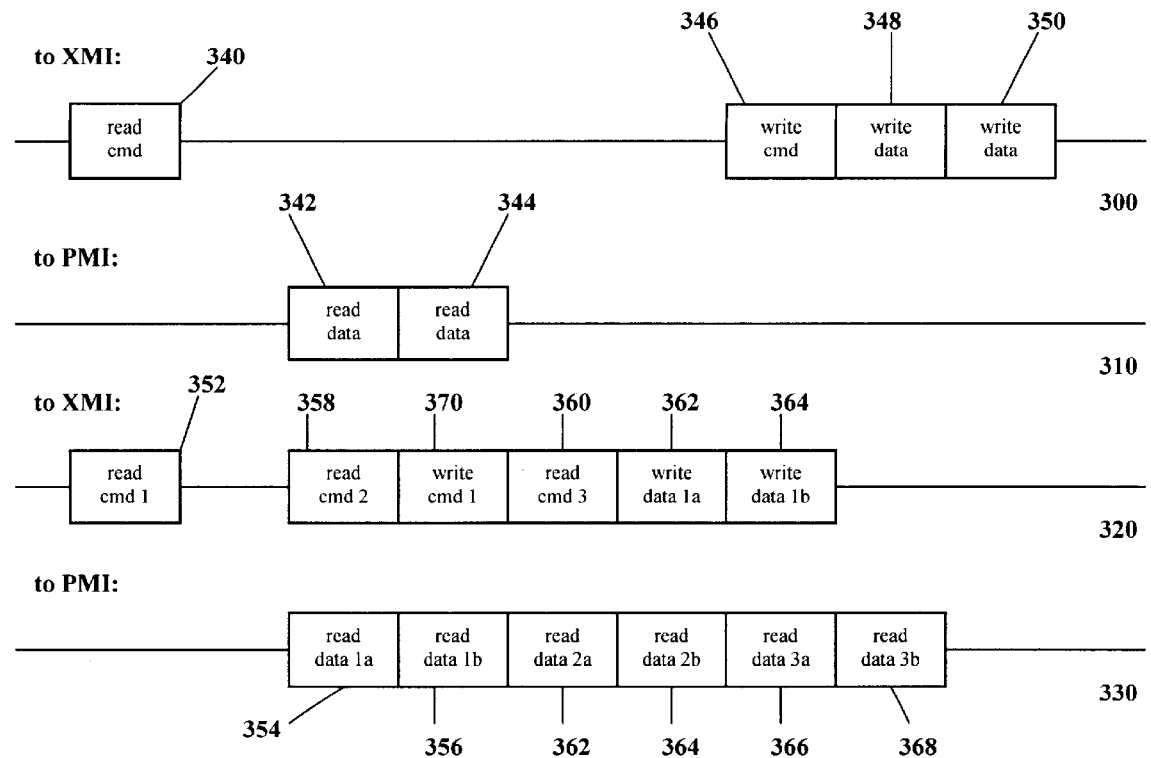
FIG. 3 illustrates packet flow of typical read, write, and interacting read-write transactions utilized in a memory system according to an embodiment of the present invention.

FIG. 3 illustrates packet flow of typical read, write, and interacting read-write transactions utilized in a memory system according to an embodiment of the present invention. In FIG. 3, transaction packets move in the same direction and share a channel. Each channel may be on its own unidirectional interconnect, or two channels may share a simultaneous bi-directional interconnect. Diagrams 300 and 310 are transaction packets transmitted to the XMI 120 and those transmitted to the PMI 110, respectively. A read command (read cmd) packet 340 transmitted to the XMI 120 in diagram 300 results in the read data packets 342, 344 being transmitted to the PMI 110, as shown in diagram 310. A write command (write cmd) 346 transmitted to the XMI 120 in diagram 300 is followed by the write data 348, 350 also being transmitted to the XMI 120 along the same channel.

Referring to diagrams 320 and 330, a "read cmd 1" packet 352 transmitted to the XMI 120 results in the "read data 1a" packet 354 and "read data 1b" packet 356 to be transmitted to the PMI 110. Similarly, a "read cmd 2" packet 358 and a "read cmd 3" packet 360 result in "read data 2a" packet 262 and "read data 2b" packet 364, and "read data 3a" packet 366 and "read data 3b" packet 368, respectively, to be transmitted to the PMI 110. In diagram 320, a "write cmd 1" packet 370 is followed by "write data 1a" packet 362 and "write data 1b" packet 364 to be transmitted to the XMI 120 along the same channel. In diagram 320, "read cmd 3" packet 360 occurs between the "write cmd 1" packet 370 and the corresponding write data packets 362, 364, whereas in diagram 300, write data packet 348, 350 immediately follow write command packet 346. This illustrates that variable timing offsets may be utilized to implement transactions.

Figure 4:
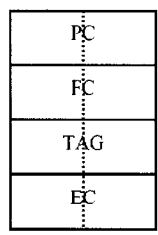
FIG. 4 illustrates examples of transaction packet formats utilized to designate fields utilized in a memory system according to an embodiment of the present invention.
Figure 4:
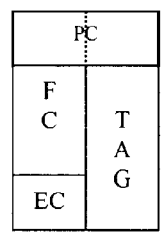
Figure 4:
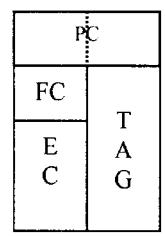

FIG. 4 illustrates examples of transaction packet formats utilized to designate fields utilized in a memory system according to an embodiment of the present invention. In this example, each packet type is one clock wide, with data being transferred on each edge (i.e., the rising and falling clock edges). The physical layer (electrical signaling) may be of any suitable type, such as embedded clocking, multi-level signaling, or single edge clocking. Therefore, the packets are two-bit positions wide. An illustrative data packet transfers eight bytes of data and one byte of check, for a total of 72 bits. Therefore, in this example, there are a total of 80 bits in a packet, the packet being 40-bit positions high.

Considering the read data packets, which move from the XMI 120 to the PMI 110 (or between XMIs in a multi-level configuration, as in FIG. 5). Because there are 72 bits of data including the error check code (ECC), there are eight bits remaining for the packet control (PC), flow control (FC), and tag fields, and for any additional check bits. The packet control (PC) field encodes the packet types that move in the same direction (such as, idle (no packet), read data packet, and status packet). The flow control (FC) field encodes flow control for resources in the XMI 120 (i.e., resources related to the commands and write data). The size of the tag field depends upon the depth of the out-of-order data return processing to be supported. The number of additional check bits depends upon the desired coverage for the control fields.

In FIG. 4, packet 400 shows two bits allocated for packet control (PC), which may be used to designate the following states: idle (00), read data (01), status (10), and reserved (11). The two bits allocated for flow control (FC) may be used to designate the following states: no FC (00), command FC (01), write data FC (10), command FC and write data FC (11). The two bits allocated for the tag field may be used to designate up to four types of out-of-order data return processing states.

Packet 410 of FIG. 4 illustrates another configuration. Two bits are allocated for the packet control (PC) field and the flow control (FC) field, as discussed above in packet 400. However, in the configuration of packet 410, a single check bit is used for error control (EC). The tag field is provided with three bits, which may be used to designate up to eight types of out-of-order data return processing states. Tag fields are not required if out-of-order reads are not utilized.

Packet 420 illustrates yet another packet configuration. Similarly to packet 400, two bits are allocated for packet control (PC), which may be used to designate the following states: idle (00), read data with flow control (FC) (01), other processing (10), and read data with independent flow control (IFC) (11). A single bit is provided to designate the types of flow control (FC), such as command FC (0) or write data FC (1). Two check bits are provided for the error control (EC) field (which may designate up to four different EC states), and three bits are provided for the tag field, which may designate up to eight different states. In place of the tag field may be any other field, such as status, flow control, or combinations thereof.

Other options that may be utilized for the flow control (FC) field may include: no flow control, write data flow control only, or command flow control only. To support these features, the memory requests are counted, and acknowledged by the XMI 120. For example, in order to remove explicit write data flow control, the PMI 110 counts the outstanding writes and receives an acknowledgement from the XMI 120 for each write completed.

Additionally, there are also several options available for the error control (EC) field. These options may include: no error checking, encoded check fields, and complete replication of some control bits. In the examples discussed above, encoded check fields are preferably utilized. Preferably, the added check bits are combined with the eight bits allocated for data.

In the case of status packets, the field allocated for read data is often utilized to carry status information. These packets do not require a tag field, so, this space is available to encode other packet type information. For example, various XMI-to-PMI commands may be encoded, such as, reporting error problems, or reporting the capacity of the write buffers.

Write data packets and command packets follow directly from the read data and status packet formats. For these PMI-to-XMI packets, the packet control (PC) field may indicate states such as: idle (no packet), write data packet, or command packet. The flow control (FC) field may be utilized if the resources used for read data or status must be controlled. Typically, the resource used for status will not need to be controlled because the status events may be handled with a register. Reads may also be handled with explicit flow control. In this instance, the counting of the memory requests is often sufficient. Accordingly, the tag field and the error control field are not typically be utilized in write data packets or command packets.

With respect to command packets, the fields may include: the command, command qualifiers, address, and address check bits. Possible command qualifiers may include: (1) type: for example, if the command is a read, this qualifier would indicate whether the read was to memory or XMI configuration space; (2) length: the number of "chunks" of data to be returned. For example, a two-bit field may encode the length as 1, 2, 4, or 8 chunks. Chunks are typically eight-bytes; (3) options: such as request source features. A request source may indicate where a request came from (e.g., the processor, input/output, etc.), or it could indicate an attribute of the source such as "high probability of being sequential"; and (4) write mask: preferably being an eight-bit field used to mask the eight bytes of a write packet. In the case of masked writes, a command packet is transmitted for each eight-byte data packet.

Therefore, in a sample read and write data command packet, the packet control (PC) field may indicate it being a command packet, and the command field may indicate whether it is a read or write. Flow control (FC) and error control (EC) are optional. Preferably, the read and write command packet has a 40-bit address field. By utilizing 40 bits, up to one terabyte (one trillion bytes) may be addressed. A check field may be provided to verify the address, and/or the address and control fields. Source and length fields may be utilized to indicate the source of the data, as well as the length of the data being transmitted.

Figure 6:
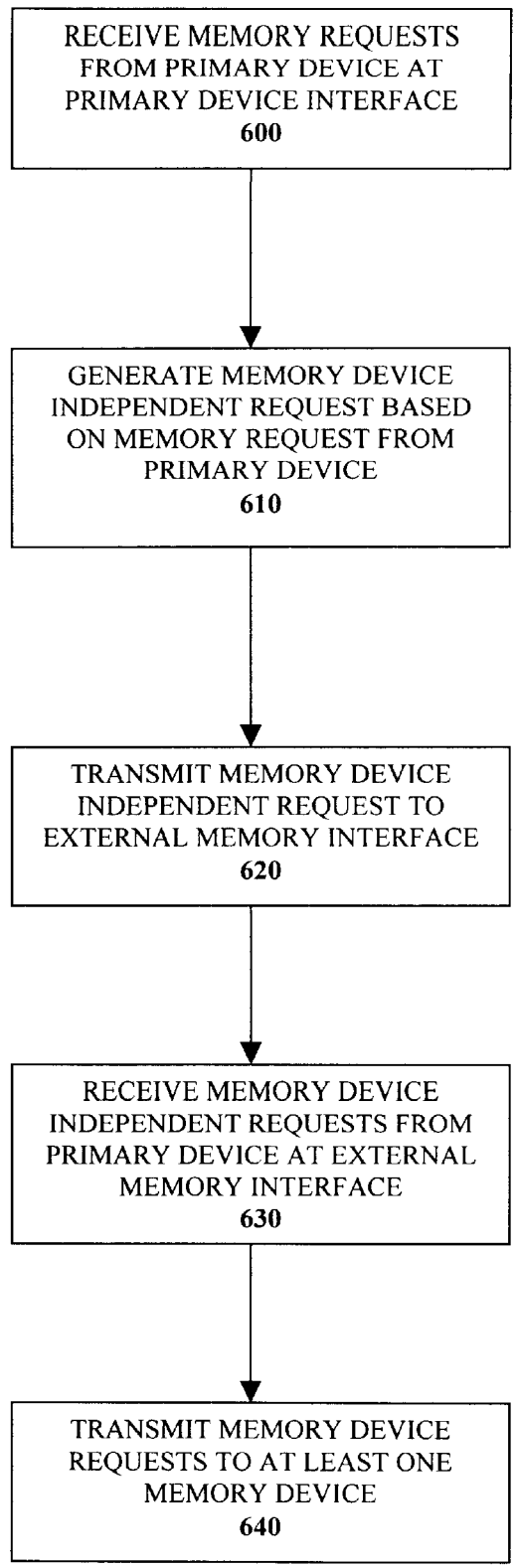
FIG. 6 illustrates a flow chart diagram of an operation of a memory system according to an embodiment of the present invention.

FIG. 6 illustrates a flow chart diagram of an operation of a memory system according to an embodiment of the present invention. Memory requests are received 600 from a primary device 100 at a primary device interface 110. Memory device independent requests are generated 610 based on the memory requests received from the primary device 100. The memory device independent requests are transmitted 620 to an external memory interface. The memory device independent requests are received 630 from the primary device 100 at the external memory interface 120. The memory device requests are transmitted 640 to at least one memory device 130. The memory device independent requests are converted into memory device dependent requests so that the memory device requests transmitted 640 to the at least one memory device 130 are memory dependent requests.

The present invention provides an interface for a memory system that is independent of the memory type being utilized. Integrating memory dependent functions on a primary device has a number of undesirable consequences. According to the present invention, these issues are resolved by moving all memory dependent functions to an external device. Typically, the interface of the present invention is between a computer memory and a processor unit (which includes memory controller capability). However, the invention may be utilized between any functional unit and its associated memory. The interface defines a partitioning of the functionality that balances the trade-offs between the integration and distribution of memory control functions and a protocol that allows efficient communication between these partitions. The protocol is optimized for low latency, high bandwidth memory operations, but remains memory type neutral.

In one embodiment, the XMI 120 and its connected memory devices 130 may be housed within a single memory module. Therefore, memory device manufactures may incorporate the XMI 120 and memory devices 130 together into a memory module, as long as the XMI 120 utilizes a set protocol for communication with the PMI 110 over the MII 15 connection. By completely separating the memory dependent functions from the primary device, memory device 130 performance may be optimized irrespective of the primary device being used. Greater flexibility is also provided to allow use of existing and future technology memory devices, with existing and future technology memory controllers, all by utilizing a standard memory independent protocol over the MII 115 connection.

In yet another embodiment, the PMI 110 may be integrated onto a single memory module, along with the XMI 120 and memory devices 130. However, any suitable placement, integration, or distribution of the PMI 110 and XMI 120 components throughout a memory system may be utilized.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A memory system, comprising:
   a primary memory interface, coupled to a primary device, adapted to receive memory requests from the primary device, and to transmit memory device independent requests based on the memory requests from the primary device;
   an external memory interface coupled to at least one memory device via a memory interconnect; and
   a memory independent interconnect coupled to the primary memory interface and the external memory interface, adapted to transport the memory device independent requests from the primary memory interface to the external memory interface.

2. The memory system according to claim 1, wherein the external memory interface is adapted to receive and convert the memory device independent requests from the primary memory interface into memory device dependent requests, and to transmit the memory device dependent requests to the at least one memory device.

3. The memory system according to claim 1, wherein the primary device is a microprocessor.

4. The memory system according to claim 1, wherein the memory independent interconnect is further adapted to transport command and address information and write data from the primary device interface to the external memory interface.

5. The memory system according to claim 1, wherein the memory independent interconnect is further adapted to transport read data and status information from the external memory interface to the primary memory interface.

6. The memory system according to claim 5, wherein the status information includes at least one of a status of the external memory interface and a status of a memory operation.

7. A method of operating a memory system, the method comprising:
   receiving memory requests from a primary device at a primary memory interface;
   generating memory device independent requests based on the memory requests received from the primary device;
   transmitting the memory device independent requests to an external memory interface;
   receiving the memory device independent requests from the primary device at the external memory interface; and
   transmitting memory device requests to at least one memory device.

8. The method according to claim 7, further including converting the memory device independent requests into memory device dependent requests, wherein transmitting the memory device requests includes transmitting the memory device dependent requests to the at least one memory device.

9. The method according to claim 7, wherein the external memory interface is coupled to the at least one memory device via a memory interconnect.

10. The method according to claim 7, wherein a memory independent interconnect is coupled to the primary memory interface and the external memory interface, the memory independent interconnect adapted to transport the memory device independent requests from the primary memory interface to the external memory interface.

11. The method according to claim 7, wherein the primary device is a microprocessor.

12. The method according to claim 7, further including transmitting at least one of command and address information and write data from the primary device interface to the external memory interface.

13. The method according to claim 7, further including transmitting at least one of read data and status information from the external memory interface to the primary memory interface.

14. The method according to claim 13, wherein the status information includes at least one of a status of the external memory interface and a status of a memory operation.

15. A memory system, comprising:
   a primary memory interface coupled to a primary device adapted to receive memory requests from the primary device, and to transmit memory device independent requests based on the memory requests from the primary device;
   an external memory interface adapted to receive the memory device independent requests from the primary memory interface;
   a memory independent interconnect, coupled to the primary memory interface and the external memory interface, adapted to transport the memory device independent requests from the primary memory interface to the external memory interface;
   at least one secondary external memory interface coupled to the external memory interface and coupled to at least one memory device via a memory interconnect; and
   at least one secondary memory independent interconnect, coupled to the external memory interface and the at least one secondary external memory interface, adapted to transport the memory device independent requests from the external memory interface to the at least one secondary external memory interface.

16. The memory system according to claim 15, wherein the at least one secondary external memory interface is adapted to receive and convert the memory device independent requests from the external memory interface into memory device dependent requests, and to transmit the memory device dependent requests to the at least one memory device.

17. The memory system according to claim 15, wherein the primary device is a microprocessor.

18. The memory system according to claim 15, wherein the memory independent interconnect is further adapted to transport command and address information and write data from the primary device interface to the external memory interface.

19. The memory system according to claim 15, wherein the memory independent interconnect is further adapted to transport read data and status information from the external memory interface to the primary memory interface.

20. The memory system according to claim 19, wherein the status information includes at least one of a status of the external memory interface and a status of a memory operation.

* * * * *